US012730259B2

(12) United States Patent
Vulovic et al.

(10) Patent No.: US 12,730,259 B2
(45) Date of Patent: Sep. 8, 2026

(54) LOW LOSS SPLITTER-COMBINER WAVEGUIDE STRUCTURES IN PHOTONIC CIRCUITS

(71) Applicant: Intel Corporation, Santa Clara, CA (US)

(72) Inventors: Boris Vulovic, Campbell, CA (US); Wenhua Lin, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 18/463,785

(22) Filed: Sep. 8, 2023

(65) Prior Publication Data

US 2025/0035838 A1 Jan. 30, 2025

Related U.S. Application Data

(60) Provisional application No. 63/515,892, filed on Jul. 27, 2023.

(51) Int. Cl.

*G02B 6/12* (2006.01)
*G02B 6/122* (2006.01)
*G02B 6/125* (2006.01)
*G02B 6/136* (2006.01)

(52) U.S. Cl.

CPC ....... *G02B 6/12004* (2013.01); *G02B 6/1228* (2013.01); *G02B 6/125* (2013.01); *G02B 6/136* (2013.01); *G02B 2006/12147* (2013.01)

(58) Field of Classification Search

CPC .... G02B 6/125; G02B 6/136; G02B 6/12004; G02B 6/1228

See application file for complete search history.

(56) References Cited

U.S. PATENT DOCUMENTS

| | | | | |
|---|---|---|---|---|
| 2001/0005438 A1* | 6/2001 | Menezo | H04B 10/506 | 385/37 |
| 2003/0123796 A1* | 7/2003 | Wang | G02B 6/10 | 385/39 |
| 2004/0131310 A1* | 7/2004 | Walker | G02B 6/136 | 385/39 |
| 2006/0056845 A1* | 3/2006 | Parsons | H04L 27/223 | 398/41 |
| 2012/0250007 A1 | 10/2012 | Na et al. | | |
| 2014/0086522 A1* | 3/2014 | Adams | G02B 6/125 | 385/14 |
| 2019/0235166 A1 | 8/2019 | Baudot | | |

(Continued)

FOREIGN PATENT DOCUMENTS

| | | |
|---|---|---|
| CN | 112612078 A | 4/2021 |
| KR | 1020130069146 A | 6/2013 |

(Continued)

OTHER PUBLICATIONS

A list of third party refs were considered (Year: 2025).*

*Primary Examiner* — Michael P Mooney
(74) *Attorney, Agent, or Firm* — Akona IP PC

(57) ABSTRACT

Disclosed herein are embodiments of a waveguide structure, comprising: a deep rib waveguide on a slab and a plurality of shallow rib waveguides on the slab. The deep rib waveguide has a first etch-depth, the plurality of shallow rib waveguides has a second etch-depth, and the first etch-depth is greater than the second etch-depth.

20 Claims, 8 Drawing Sheets

(56) References Cited

U.S. PATENT DOCUMENTS

| | | | | |
|---|---|---|---|---|
| 2019/0369244 | A1* | 12/2019 | Asghari | G01S 7/4815 |
| 2022/0276455 | A1* | 9/2022 | Rubinstein | G02B 6/12004 |
| 2023/0069468 | A1* | 3/2023 | Iwatsuka | G02B 6/122 |
| 2023/0314732 | A1* | 10/2023 | Hirata | G02B 6/1228<br>385/31 |

FOREIGN PATENT DOCUMENTS

| | | | |
|---|---|---|---|
| WO | 2012171557 | A1 | 12/2012 |
| WO | WO 2022/071377 | A1 † | 4/2022 |

* cited by examiner
† cited by third party

LOW LOSS SPLITTER-COMBINER WAVEGUIDE STRUCTURES IN PHOTONIC CIRCUITS

CROSS-REFERENCE TO RELATED APPLICATION

This application claims the benefit of priority under 35 U.S.C. § 119(e) to U.S. Provisional patent application Ser. No. 63/515,892 filed on Jul. 27, 2023, entitled LOW LOSS SPLITTER-COMBINER WAVEGUIDE STRUCTURES IN PHOTONIC CIRCUITS. The disclosure of the prior Application is considered part of and is incorporated by reference in the disclosure of this Application.

BACKGROUND

The present subject matter relates to microelectronics and photonics packages. More specifically, the present disclosure relates to silicon photonic systems such as those used with light detection and ranging (LIDAR) sensors, biosensors and such other optical sensors. Such silicon photonic systems include many optical components such as a trans-impedance amplifier, laser drivers, optical switches, semiconductor optical amplifiers, radio frequency modulators, splitter-combiners, etc. The systems may include both electrical integrated circuits (EICs) as well as photonic integrated circuits (PICs).

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 is a simplified top view of a low loss splitter-combiner of a photonic circuit according to some embodiments of the present disclosure.

FIG. 2 is a simplified cross-sectional view of the low loss splitter-combiner of FIG. 1 along axis A-A' according to some embodiments of the present disclosure.

FIG. 3 is a simplified cross-sectional view of the low loss splitter-combiner of FIG. 1 along axis B-B' according to some embodiments of the present disclosure.

FIG. 4 is a simplified cross-sectional view of the low loss splitter-combiner of FIG. 1 along axis C-C' according to some embodiments of the present disclosure.

FIG. 5 is a simplified perspective view of the low loss splitter-combiner of FIG. 1 according to some embodiments of the present disclosure.

DETAILED DESCRIPTION

Figure 6:
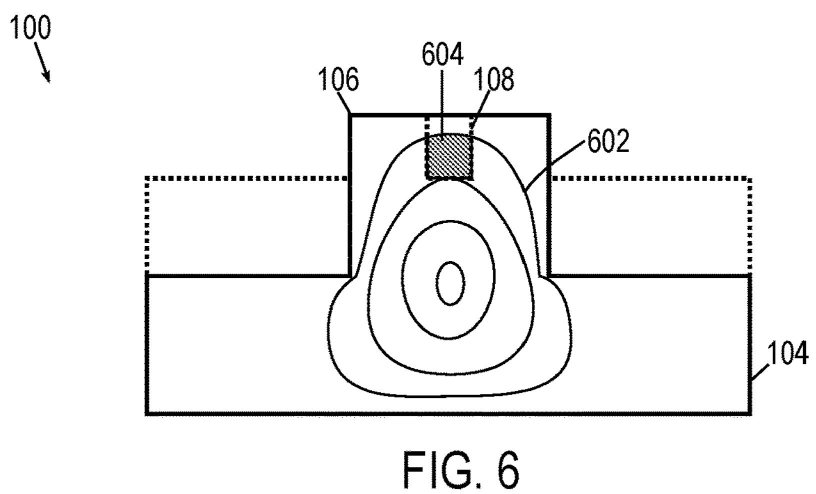
FIG. 6 is a simplified block diagram showing optical signal contours in the low loss splitter-combiner of FIG. 1 according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating low loss splitter-combiners described herein, it might be useful to first understand phenomena that may come into play in some systems where photonic devices may be used. The following foundational information may be viewed as a basis from which the present disclosure may be properly explained. Such information is offered for purposes of explanation only and, accordingly, should not be construed in any way to limit the broad scope of the present disclosure and its potential applications.

Silicon photonics-based sensor systems such as LIDAR are being developed to meet the needs for various sensor capabilities and functionalities in different applications. Such systems are increasingly being used in wideband environments covering a large range of electromagnetic wavelengths (e.g., 1300 nm-2500 nm). Currently available sensors typically sense wavelengths in narrow ranges, and thus several such sensors may have to be used in wideband applications to cover the desired range of wavelengths. However, manufacturers are increasingly faced with the challenge to shrink the form factor of sensor systems, so that increasing the number of sensors in a constrained space presents many challenges. Another challenge in such photonics systems is the need to reduce loss and thereby improve sensitivity and resolution of the sensors.

Accordingly, a splitter-combiner is described herein that may be used to achieve low optical loss over a wide range of wavelengths in components for optical power splitting and/or combining. Varied etch-depths for ribs on slabs may be used to tune excess loss within desired parameters. In some such embodiments, the excess loss can be reduced by more than two times in a single splitter-combiner.

The various embodiments of the splitter-combiner as described herein may be implemented in a PIC. In some embodiments, the PIC may be fabricated using conventional lithography techniques applicable to silicon-based ICs (e.g., silicon photonics PIC). The PIC may be co-packaged with an EIC in a single microelectronic device in an example embodiment. In other embodiments, the PIC may be a standalone component, optically and electrically coupled to one or more EICs and/or other electronic components in a larger electronic/photonic system.

In the following detailed description, various aspects of the illustrative implementations may be described using terms commonly employed by those skilled in the art to convey the substance of their work to others skilled in the art.

The terms “circuit” and “circuitry” mean one or more passive and/or active electrical and/or electronic components and/or photonic components and/or optical components that are arranged to cooperate with one another to provide a desired function. The terms also refer to analog circuitry, digital circuitry, hard wired circuitry, programmable circuitry, microcontroller circuitry and/or any other type of physical hardware electrical and/or electronic component.

The term “integrated circuit” (IC) means a circuit that is integrated into a monolithic semiconductor or analogous material.

In some embodiments, the IC dies disclosed herein may comprise substantially monocrystalline semiconductors, such as silicon or germanium, as a base material (e.g., substrate, body) on which integrated circuits are fabricated with traditional semiconductor processing methods. The semiconductor base material may include, for example, N-type or P-type materials. Dies may include, for example, a crystalline base material formed using a bulk silicon (or other bulk semiconductor material) or a silicon-on-insulator (SOI) structure. In some other embodiments, the base material of one or more of the IC dies may comprise alternate materials, which may or may not be combined with silicon that include but are not limited to germanium, indium antimonide, lead telluride, indium arsenide, indium phosphide, gallium arsenide, indium gallium arsenide, gallium antimonide, or other combinations of group III-N, group III-V, group II-VI, or group IV materials. In yet other embodiments, the base material may comprise compound semiconductors, for example, with a first sub-lattice of at least one element from group III of the periodic table (e.g., Al, Ga, In), and a second sub-lattice of at least one element of group V of the periodic table (e.g., P, As, Sb). In yet other embodiments, the base material may comprise an intrinsic IV or III-V semiconductor material or alloy, not intentionally doped with any electrically active impurity; in alternate embodiments, nominal impurity dopant levels may be present. In still other embodiments, dies may comprise a non-crystalline material, such as polymers; for example, the base material may comprise silica-filled epoxy. In other embodiments, the base material may comprise high mobility oxide semiconductor material, such as tin oxide, antimony oxide, indium oxide, indium tin oxide, titanium oxide, zinc oxide, indium zinc oxide, indium gallium zinc oxide (IGZO), gallium oxide, titanium oxynitride, ruthenium oxide, or tungsten oxide. In general, the base material may include one or more of tin oxide, cobalt oxide, copper oxide, antimony oxide, ruthenium oxide, tungsten oxide, zinc oxide, gallium oxide, titanium oxide, indium oxide, titanium oxynitride, indium tin oxide, indium zinc oxide, nickel oxide, niobium oxide, copper peroxide, IGZO, indium telluride, molybdenite, molybdenum diselenide, tungsten diselenide, tungsten disulfide, N- or P-type amorphous or polycrystalline silicon, germanium, indium gallium arsenide, silicon germanium, gallium nitride, aluminum gallium nitride, indium phosphide, and black phosphorus, each of which may possibly be doped with one or more of gallium, indium, aluminum, fluorine, boron, phosphorus, arsenic, nitrogen, tantalum, tungsten, and magnesium, etc. Although a few examples of the material for dies are described here, any material or structure that may serve as a foundation (e.g., base material) upon which IC circuits and structures as described herein may be built falls within the spirit and scope of the present disclosure.

Unless described otherwise, IC dies described herein include one or more IC structures (or, simply, “ICs”) implementing (i.e., configured to perform) certain functionality. In one such example, the term “memory die” may be used to describe a die that includes one or more ICs implementing memory circuitry (e.g., ICs implementing one or more of memory devices, memory arrays, control logic configured to control the memory devices and arrays, etc.). In another such example, the term “compute die” may be used to describe a die that includes one or more ICs implementing logic/compute circuitry (e.g., ICs implementing one or more of I/O functions, arithmetic operations, pipelining of data, etc.).

The term “optical structure” includes arrangements of forms fabricated in ICs to receive, transform and/or transmit optical signals as described herein. It may include optical conductors such as waveguides, electromagnetic radiation sources such as lasers and light-emitting diodes (LEDs) and electro-optical devices such as photodetectors.

In various embodiments, any PIC described herein may comprise a semiconductor material including, for example, N-type or P-type materials. The PIC may include, for example, a crystalline base material formed using a bulk silicon (or other bulk semiconductor material) or a SOI structure (or, in general, a semiconductor-on-insulator structure). In some embodiments, the PIC may be formed using alternative materials, which may or may not be combined with silicon, that include, but are not limited to, lithium niobite, indium phosphide, silicon dioxide, germanium, silicon germanium, indium antimonide, lead telluride, indium arsenide, indium phosphide, gallium arsenide, aluminum gallium arsenide, aluminum arsenide, indium aluminum arsenide, aluminum indium antimonide, indium gallium arsenide, gallium nitride, indium gallium nitride, aluminum indium nitride or gallium antimonide, or other combinations of group III-N or group IV materials. In some embodiments, the PIC may comprise a non-crystalline material, such as polymers. In some embodiments, the PIC may be formed on a printed circuit board (PCB). In some embodiments, the PIC may be inhomogeneous, including a carrier material (such as glass or silicon carbide) as a base material with a thin semiconductor layer over which is an active side comprising transistors and like components. Although a few examples of the material for the PIC are described here, any material or structure that may serve as a foundation upon which the PIC may be built falls within the spirit and scope of the present disclosure.

The term “insulating” means “electrically insulating,” the term “conducting” means “electrically conducting,” unless otherwise specified. With reference to optical signals and/or devices, components and elements that operate on or using optical signals, the term “conducting” can also mean “optically conducting.”

The terms "oxide," "carbide," "nitride," etc. refer to compounds containing, respectively, oxygen, carbon, nitrogen, etc.

The term "waveguide" refers to any structure that acts to guide the propagation of light from one location to another location typically through a substrate material such as silicon or glass. In various examples, waveguides may be formed from silicon, doped silicon, silicon nitride, glasses such as silica (e.g., silicon dioxide or $SiO_2$), borosilicate (e.g., 70-80 wt % $SiO_2$, 7-13 wt % of $B_2O_3$, 4-8 wt % $Na_2O$ or $K_2O$, and 2-8 wt % of $Al_2O_3$) and so forth. Waveguides may be formed using various techniques including but not limited to forming waveguides in situ. For example, in some embodiments, waveguides may be formed in situ in glass using low temperature glass-to-glass bonding or by laser direct writing. Waveguides formed in situ may have lower loss characteristics.

The terms "substantially," "close," "approximately," "near," and "about," generally refer to being within +/−20% of a target value (e.g., within +/−5% or 10% of a target value) based on the context of a particular value as described herein or as known in the art.

Terms indicating orientation of various elements, e.g., "coplanar," "perpendicular," "orthogonal," "parallel," or any other angle between the elements, generally refer to being within +/−5%-20% of a target value based on the context of a particular value as described herein or as known in the art.

The term "connected" means a direct connection (which may be one or more of a mechanical, electrical, and/or thermal connection) between the things that are connected, without any intermediary devices, while the term "coupled" means either a direct connection between the things that are connected, or an indirect connection through one or more passive or active intermediary devices.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

The disclosure may use perspective-based descriptions such as "above," "below," "top," "bottom," and "side"; such descriptions are used to facilitate the discussion and are not intended to restrict the application of disclosed embodiments. The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers. The term "dispose" as used herein refers to position, location, placement, and/or arrangement rather than to any particular method of formation. The term "between," when used with reference to measurement ranges, is inclusive of the ends of the measurement ranges.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). When used herein, the notation "A/B/C" means (A), (B), and/or (C).

As used herein, the terms "package" and "IC package" are synonymous, as are the terms "die" and "IC die." Furthermore, the terms "chip," "chiplet," "die," and "IC die" may be used interchangeably herein. Although certain elements may be referred to in the singular herein, such elements may include multiple sub-elements. For example, "an insulator material" may include one or more insulator materials.

Although certain elements may be referred to in the singular herein, such elements may include multiple sub-elements. For example, "an optically conductive material" may include one or more optically conductive materials. In another example, "a dielectric material" may include one or more dielectric materials.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner. For convenience, the phrase "waveguides 106" may be used to refer to a collection of waveguides 108-1, 104-2, and so on.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. The accompanying drawings are not necessarily drawn to scale. In the drawings, same reference numerals refer to the same or analogous elements/materials shown so that, unless stated otherwise, explanations of an element/material with a given reference numeral provided in context of one of the drawings are applicable to other drawings where element/materials with the same reference numerals may be illustrated. Further, the singular and plural forms of the labels may be used with reference numerals to denote a single one and multiple ones respectively of the same or analogous type, species, or class of element.

Furthermore, in the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using, e.g., images of suitable characterization tools such as scanning electron microscopy (SEM) images, transmission electron microscope (TEM) images, or non-contact profilometer. In such images of real structures, possible processing and/or surface defects could also be visible, e.g., surface roughness, curvature or profile deviation, pit or scratches, not-perfectly straight edges of materials, tapered vias or other openings, inadvertent rounding of corners or variations in thicknesses of different material layers, occasional screw, edge, or combination dislocations within the crystalline region(s), and/or occasional dislocation defects of single atoms or clusters of atoms. There may be other defects not listed here but that are common within the field of device fabrication and/or packaging.

Note that in the figures, various components (e.g., interconnects) are shown as aligned (e.g., at respective interfaces) merely for ease of illustration; in actuality, some or all of them may be misaligned. In addition, there may be other components, such as bond-pads, landing pads, metallization, etc. present in the assembly that are not shown in the figures to prevent cluttering. Further, the figures are intended to show relative arrangements of the components within their assemblies, and, in general, such assemblies may include other components that are not illustrated (e.g., various interfacial layers or various other components related to optical functionality, electrical connectivity, or thermal mitigation). For example, in some further embodiments, the assembly as shown in the figures may include more dies along with other electrical components. Additionally, although some components of the assemblies are illustrated in the figures as being planar rectangles or formed of rectangular solids, this is simply for ease of illustration, and embodiments of these assemblies may be curved, rounded, or otherwise irregularly shaped as dictated by and sometimes inevitable due to the manufacturing processes used to fabricate various components.

In the drawings, a particular number and arrangement of structures and components are presented for illustrative purposes and any desired number or arrangement of such structures and components may be present in various embodiments.

Further, unless otherwise specified, the structures shown in the figures may take any suitable form or shape according to material properties, fabrication processes, and operating conditions.

Figure 10:
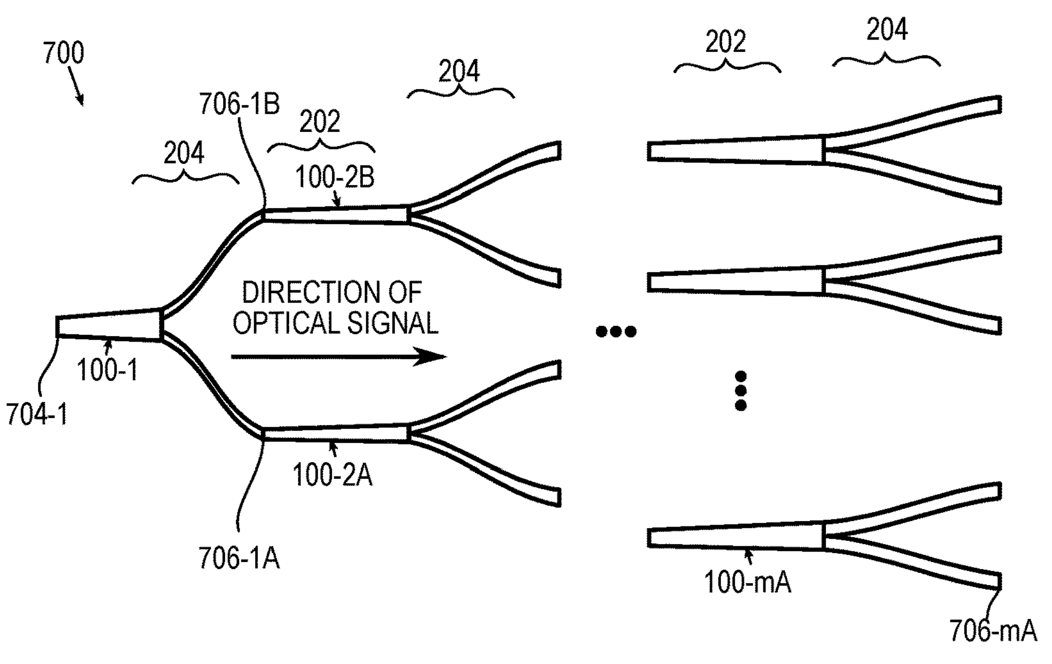
FIG. 10 is a simplified top view of a portion of another example photonic circuit having a low loss splitter-combiner according to some embodiments of the present disclosure.

For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 112*a*-112*e*), such a collection may be referred to herein without the letters (e.g., as "112").

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

EXAMPLE EMBODIMENTS

Figures 1, 2, 3, 4, 5:
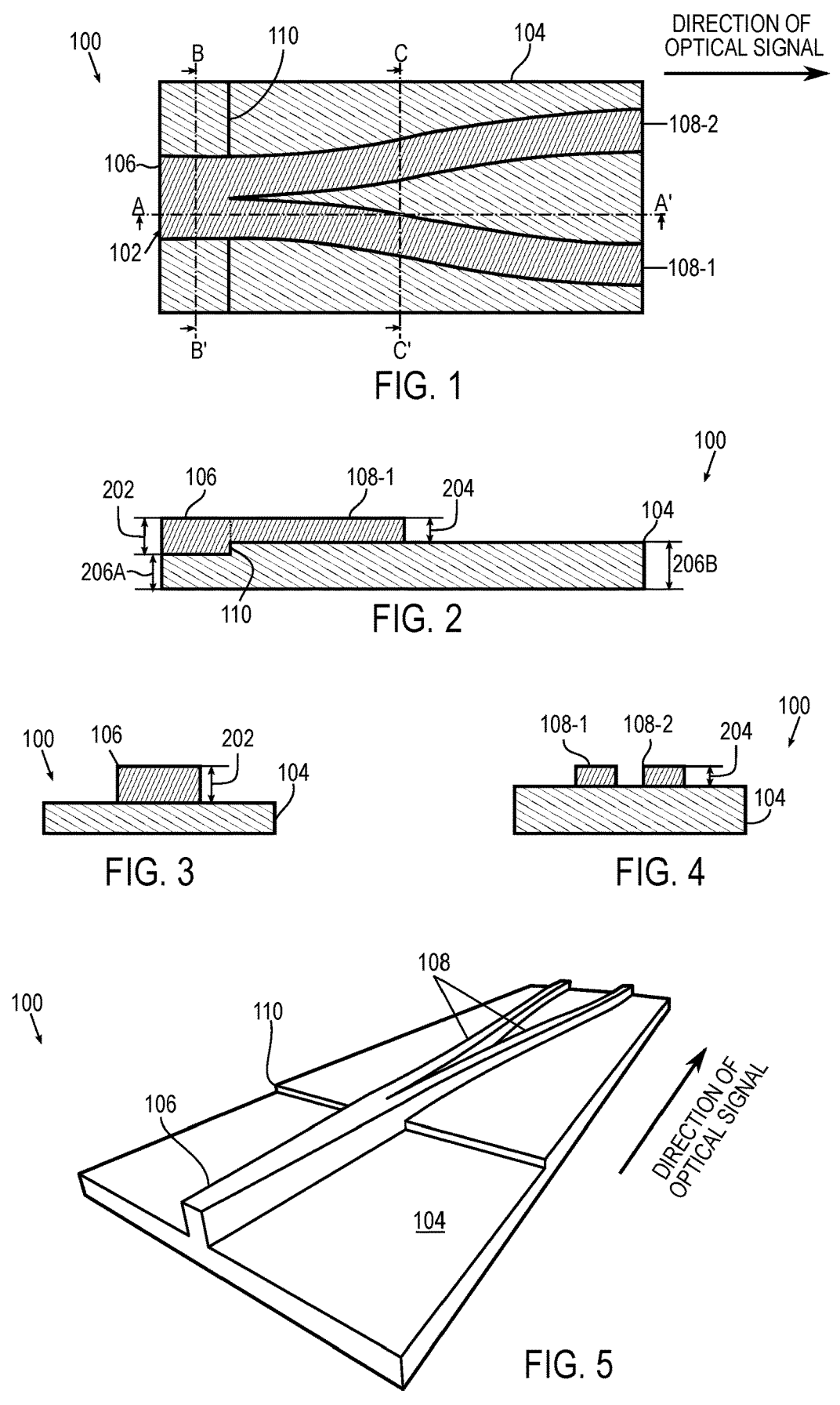

FIG. 1 is a simplified top view of a low loss splitter-combiner 100 of a photonic circuit according to some embodiments of the present disclosure. In the example embodiment shown in the figure, splitter-combiner 100 is a Y-splitter. Any other types of splitters and/or combiners may be included in different embodiments of splitter-combiner 100 as is suitable for a particular application or end use. Splitter-combiner 100 comprises a waveguide structure including rib waveguides 102 etched on a slab 104. Slab 104 comprises a planar waveguide with a shape and material that confines an optical signal within its volume by total internal reflection. In many embodiments, the refractive index of slab 104 may be larger than that of surrounding materials. In some embodiments, slab 104 may comprise an optically conductive material coated with a cladding material of higher refractive index than the optically conductive material. For example, a cladding layer of neodymium-doped yttrium aluminum garnet (YAG) layer may be sandwiched in undoped YAG with slightly lower refractive index. The cladding material may be absent between slab 104 and rib waveguides 102, and the refractive index of rib waveguides 102 may be substantially same as of slab 104. In some embodiments, rib waveguides 102 may be formed by etching slab 104 to a desired etch-depth and according to a desired shape to form suitable paths for optical signals.

In various embodiments, rib waveguides 102 may comprise two portions: a deep rib waveguide 106 and shallow rib waveguides 108 (e.g., 108-1 and 108-2). Slab 104 may comprise silicon oxide over a silicon substrate in some embodiments. Note that in the figure, a substrate (if present) is not shown merely for ease of illustration and not as a limitation. In some embodiments, slab 104 may be disposed over a substrate having a different refractive index compared to waveguides 102. In some other embodiments, slab 104 may be absent entirely, with rib waveguides 102 disposed over the substrate directly. Rib waveguides 102 may comprise any suitable material that facilitates signal propagation in the wavelengths desired, including silicon, silicon nitride, silicon oxide, SOI, and other materials suitable for cladding in optical waveguides. In embodiments in which rib waveguides 102 comprise silicon nitride ($Si_3N_4$), splitter-combiner 100 may be used for wavelengths in the range of 700 nm to 2500 nm. In some embodiments, slab 104 may comprise the same material as rib waveguides 102; in other embodiments slab 104 may comprise a different material than rib waveguides 102.

Etch-depth of the rib waveguides 102 over slab 104 may be varied in the direction of the optical signal at a part of splitter-combiner 100 to reduce the excess optical insertion loss, for example, more than two times, with specific etch-depth variations. Note that the etch-depth comprises the thickness of waveguides 102 in a direction perpendicular to the direction of the optical signal and to the surface of slab 104. In various embodiments, an etch boundary 110 between regions of dissimilar etch-depths (e.g., transition between two different etch-depths) may be proximate to a bifurcation point (or line or area or volume) where the optical signal pathway branches from one, to many paths. In some embodiments, etch boundary 110 may be perpendicular to the direction of the optical signal in a plane of slab 104 and perpendicular to the etch-depth. For example, in the Y-splitter embodiment of splitter-combiner 100 as shown in the figure, etch boundary 110 may be in the region proximate to splitting of rib waveguide 102 into two branches, namely from deep rib waveguide 106 to shallow rib waveguides 108-1 and 108-2.

The region of rib waveguides 102 with deeper sidewalls is deep rib waveguide 106, and the corresponding etch-depth is termed "first" etch-depth herein. In some embodiments, deep rib waveguide 106 may be etched along the entire depth of slab 104, resulting in a ridge waveguide configuration, in which the refractive index of the deep rib waveguide is different from the refractive index of the structure (e.g., substrate) on which it is disposed and with which it is in direct contact. The region of rib waveguides 106 with shallower sidewalls is shallow rib waveguide 108 and the corresponding etch-depth is termed "second" etch-depth. Such terminology is merely for ease of explanation and should not be construed as limitations. The slab depth around deep rib waveguide 106 may be smaller than the slab depth around shallow rib waveguide 108 whereas the overall depth of slab 104 and rib waveguides 102 may be constant along the direction and path of the optical signal.

Embodiments of rib waveguides 102 having varied etch-depths may be used in wideband applications with optical signals in a range between 1300 nm and 2500 nm. Some embodiments may be used in both transverse electric field mode and transverse magnetic field mode. The varied etch-depth along the direction of the optical signal at waveguide branches as described herein may contribute to an excess loss of approximately 0.25 dB across the wavelength, which is lower than in cases without such varied etch-depth. The measure of the excess loss in a Y-splitter as shown in the figure is $10\times\log_{10}[(\text{output 1}+\text{output 2})/\text{input})]$, where input is the optical signal power measured across a cross-section of deep rib waveguide 106, and output 1 and output 2 are the optical signal intensities measured across cross-sections of two shallow rib waveguides 108-1 and 108-2. The table below shows excess loss (in dB) across four different etch-depths in the branches of the Y-splitter embodiment of FIG. 1.

| Etch-depth (ED) | Excess Loss [dB] (λ = 1.4 μm) | Excess Loss [dB] (λ = 1.9 μm) | Excess Loss [dB] (λ = 2.4 μm) |
|---|---|---|---|
| Etch 1 = First ED | −0.61 | −0.58 | −0.47 |
| Etch 2 = 85% First ED | −0.46 | −0.40 | −0.34 |
| Etch 3 = 74% First ED | −0.34 | −0.29 | −0.25 |
| Etch 4 = 64% First ED | −0.23 | −0.24 | −0.20 |

Such etch-depth variations can be simply and inexpensively implemented in any splitter-combiner 100, such as Y-splitter (as shown), star coupler, multi-mode interference (MMI) coupler, or equivalent type to reduce excess optical insertion loss. For example, such etch-depth variation may be implemented using a suitable mask and different process parameters for shallow rib waveguides 108-1 and 108-2 than deep rib waveguide 106 during fabrication. Because such components are utilized in many applications within a photonic integrated circuit (PIC) (e.g., as part of Mach Zehnder Interferometer (MIZ) 1×2 splitter), reduction in the optical loss for the entire photonic circuit could be large. Embodiments of low loss splitter-combiner 100 described herein may be used in broadband wavemeter PICs, broadband, long wavelength LIDAR/sensors, and other such emerging applications.

FIG. 2 is a simplified cross-sectional view of splitter-combiner 100 of FIG. 1 along axis A-A' according to some embodiments of the present disclosure. The total depth (i.e., thickness) of slab 104 and rib waveguides 102 may be the same along the direction of the optical signal; however, rib waveguides 102 may be thicker in the portion of deep rib waveguide 106 and thinner in the portions of shallow rib waveguides 108-1 and 108-2. Deep rib waveguide 106 has a first etch-depth 202 and shallow rib waveguides 108-1 and 108-2 have a second etch-depth 204 that is smaller than first etch-depth 202. Consequently, slab 104 may have a first thickness 206*a* under deep rib waveguide 106 and a second thickness 206*b* under shallow rib waveguide 108, with first thickness 206*a* being smaller than second thickness 206*b*. In other words, slab 104 may be thicker around shallow rib waveguides 108-1 and 108-2 than around deep rib waveguide 106. Thus, thickness comprising a sum of first etch-depth 202 and first thickness 206*a* may be same as the sum of second etch-depth 204 and second thickness 206*b*. In various embodiments, first etch-depth 202 may be between 5% of the sum of first etch depth 202 and first thickness 206*a* and 100% of the sum of first etch depth 202 and first thickness 206A (e.g., as in a channel waveguide); second etch-depth 204 may be between 5% of first etch-depth 202 and 100% of first etch-depth 202; total thickness of slab 104 and rib waveguides 102 may be between 10 nanometers and 20 micrometers. For example, in a specific embodiment, the total thickness of slab 104 and rib waveguides 102 may be 3.5 micrometers, first etch-depth 202 may be 1.9 micrometers and second etch-depth 204 may be 1.22 micrometers.

FIG. 3 is a simplified cross-sectional view of splitter-combiner 100 of FIG. 1 along axis B-B' according to some embodiments of the present disclosure. Deep rib waveguide 106 has first etch-depth 202 over slab 104.

FIG. 4 is a simplified cross-sectional view of splitter-combiner 100 of FIG. 1 along axis C-C' according to some embodiments of the present disclosure. Shallow rib waveguides 108-1 and 108-2 have second etch-depth 204 over slab 104, second etch-depth 204 being smaller (e.g., shallower) than first etch-depth 202.

FIG. 5 is a simplified perspective view of splitter-combiner 100 of FIG. 1 according to some embodiments of the present disclosure. As shown, the depth of slab 104 changes proximate to the region where deep rib waveguide 106 branches into the two shallow rib waveguides 108.

FIG. 6 is a simplified block diagram showing optical signal contours in splitter-combiner 100 of FIG. 1 according to some embodiments of the present disclosure. A first cross-section of splitter-combiner 100 of FIG. 1 is shown in continuous lines. The cross-section may be taken along axis B-B' of FIG. 1. The optical signal contours represent lines of same optical power. A second cross-section of splitter-combiner 100 is shown in dotted lines. The second cross-section is slightly farther along the rib guides from etch boundary 110 along the direction of the optical signal, and the two branches, namely shallow rib waveguides 108 are shown. The optical signal is represented by contour lines 602. Shaded portion 604 of optical signal contour 602 represents the loss of optical signal due to the loss of volume of material etched away in the split into the two branches, namely shallow rib guides 106. The shallower this region, the lower the loss. Hence, rib waveguide 102 having dissimilar etch-depths along the direction of the optical signal as described in the embodiments herein have lower loss compared to rib waveguides having the same etch-depth throughout the optical signal path.

Figure 7:
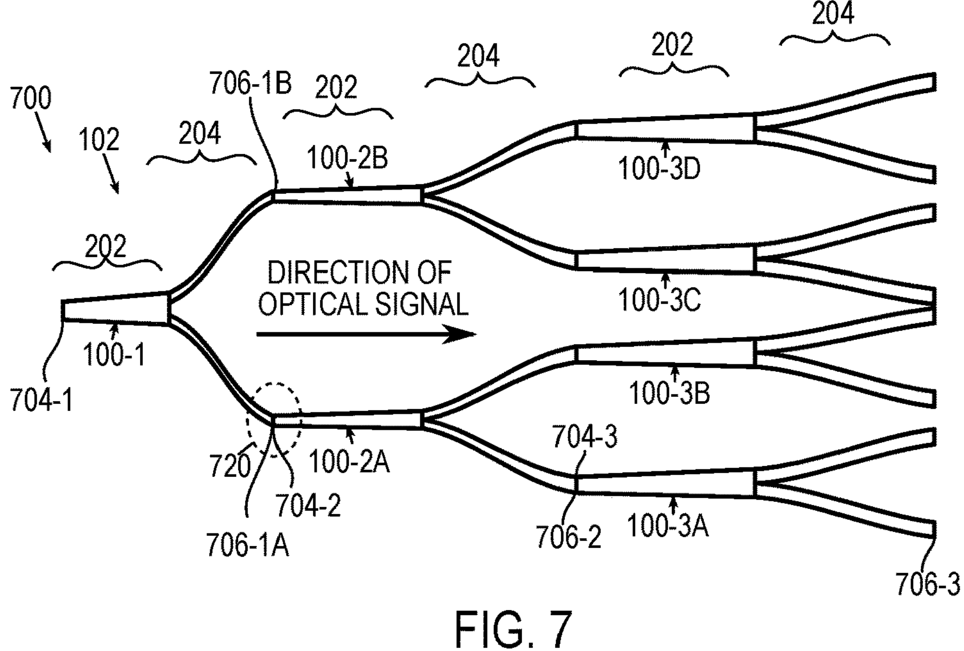
FIG. 7 is a simplified top view of a portion of an example photonic circuit having a low loss splitter-combiner according to some embodiments of the present disclosure.

FIG. 7 is a simplified top view of a portion of an example photonic circuit 700 having a plurality of low loss splitter-combiner 100 according to some embodiments of the present disclosure. Photonic circuit 700 shows a three-stage splitter with a single input and eight (23) outputs. Each instance of a stage is labeled using a letter, for example, 100-3*a* is instance "a" of splitter-combiner 100 at the third stage. At each stage, a single input is branched into two outputs. Thus, each splitter-combiner 100 may have an input end 704 and output ends 706 (e.g., splitter-combiner 100-1 has an input end 704-1 and output ends 706-1A and 706-1B). Input ends 704 of a subset of splitter-combiners 100 may be coupled to output ends 706 of other splitter-combiners 100. For example, input end 704-2 of splitter-combiner 100-2 is coupled to output end 706-1A of splitter-combiner 100-1. The excess loss after each stage for an optical signal having 1.9 micrometer wavelength is approximately 0.24 dB. Across three stages as shown, the excess loss is three times this, or approximately 0.72 dB. Each stage comprises waveguide 102 with dissimilar etch-depths along the direction of the optical signal.

Figure 8:
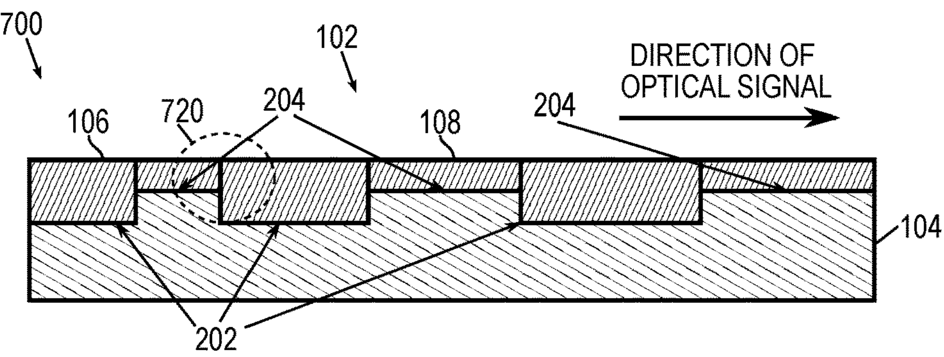
FIG. 8 is a simplified side view of the example photonic circuit of FIG. 7 according to some embodiments of the present disclosure.

FIG. 8 is a simplified side view of the example photonic circuit 700 of FIG. 7 according to some embodiments of the present disclosure. In some embodiments, waveguides 102 may have first etch-depth 202 in certain regions in each stage and second etch-depth 204 in other regions. For example, second etch-depth 204 may be implemented in the forked branches of waveguides 102 proximate to the region of the fork from a single waveguide to multiple waveguides in the direction of the optical signal at each stage. Distant from the region of the fork, for example, in region 720 as shown by a dotted circle, the etch-depth may revert to first etch-depth 202 in a lossless transition. Note that waveguides 102 may be of varied lengths and the lengths shown in the figure are merely for ease of illustration and are not to be construed as limitations. Thus, the lengths of shallow rib waveguides 108 may be of any suitable value as also the lengths of deep rib waveguides 106 without departing from the scope of the present disclosure.

Figure 9:
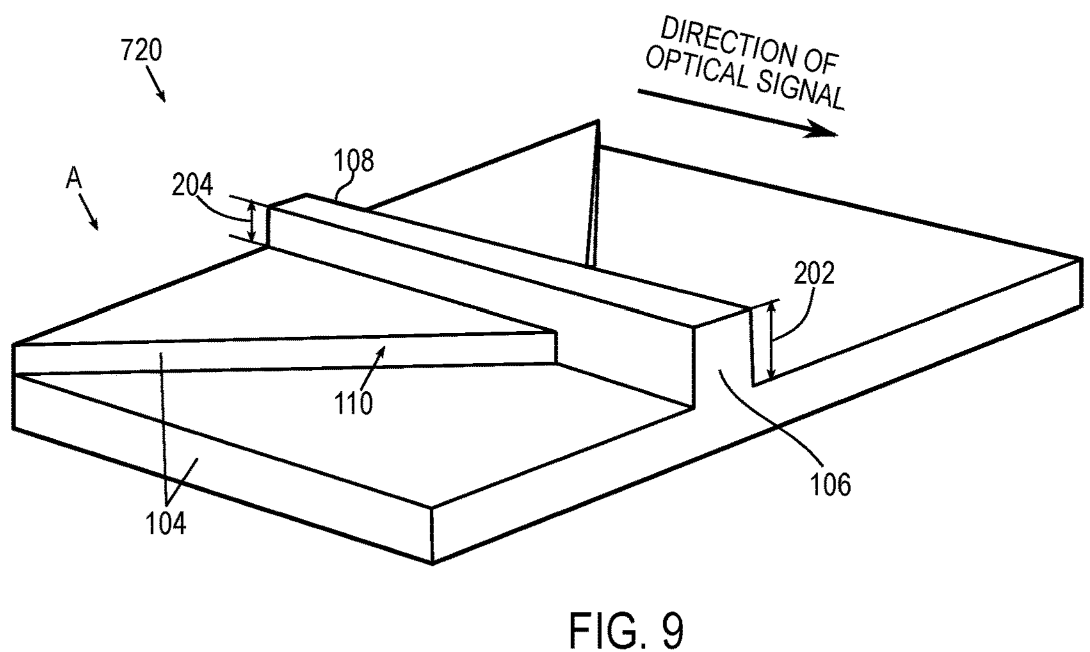
FIG. 9 is a simplified perspective view of another portion of the example photonic circuit of FIG. 7 according to some embodiments of the present disclosure.

FIG. 9 is a simplified perspective view of another portion of example photonic circuit 700 of FIG. 7 according to some embodiments of the present disclosure. The portion shown is proximate to the circular region 720 in FIGS. 7 and 8, at the juncture where shallow rib waveguide 108 of one splitter-combiner 100 (e.g., 100-1) reverts to deep rib waveguide 106 of adjacent splitter-combiner 100 (e.g., 100-2A) in the direction of the optical signal. Etch boundary 110 of slab 104 in splitter-combiner 100 (e.g., 100-1) may be tapered towards output end 706 of splitter-combiner 100, i.e., towards the deep rib waveguide 106 of the adjacent splitter-combiner 100 (e.g., 100-2A) as shown, for example, to focus the optical signal appropriately for a lossless transition.

FIG. 10 is a simplified top view of a portion of another example photonic circuit 700 having a plurality of splitter-combiner 100 according to some embodiments of the present disclosure. Photonic circuit 700 is similar to the embodiment of FIG. 7, except that there are M stages (M being any suitable integer) with a single input and 2 M outputs. At each stage comprising a single one of splitter-combiner 100, a single input comprising deep rib waveguide 106 is branched into two outputs comprising shallow rib waveguides 108-1 and 108-2. The excess loss after each stage for an optical signal having 1.9 micrometer wavelength is approximately 0.24 dB. Across five stages, for example, the excess loss is five times this, or approximately 1.2 dB.

Figure 11A:
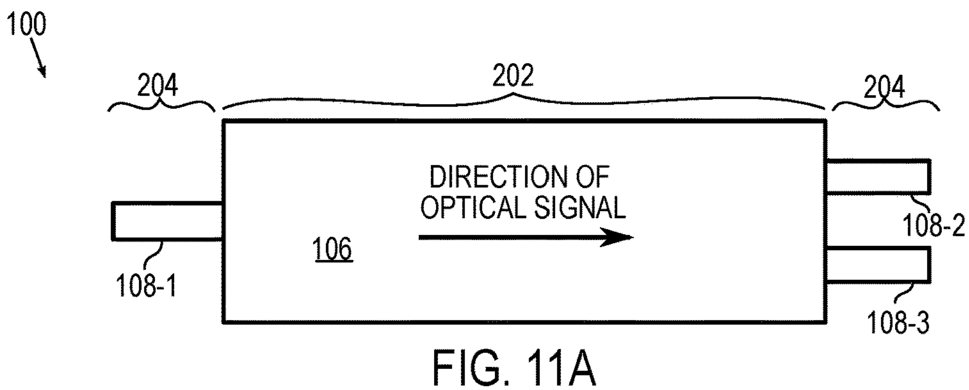
FIG. 11A is a simplified top view of an example multi-mode interference coupler according to some embodiments of the present disclosure.

FIG. 11A is a simplified top view of splitter-combiner 100 comprising an MMI coupler according to some embodiments of the present disclosure. Splitter-combiner 100 as shown in the embodiment comprises a single input and two outputs in the direction of the optical signal. The optical signal enters along one path and exits along two paths, with half the power in each exit path. These entrance and exit paths are narrow shallow rib waveguides 108-1, 108-2 and 108-3, and the MMI coupler is in the shape of a broad rectangular box, and corresponding to deep rib waveguide 106. Optical loss occurs as light travels through the MMI, so that the total output power summed across the two output branches comprising shallow rib waveguides 108-2 and 108-3 is less than the total input power in shallow rib waveguide 108-1. Additionally, the optical signal propagates through the rectangular box comprising deep rib waveguide 106 in multiple modes, while also experiencing reflection and interference. In various embodiments, the rectangular box portion of the MMI may have first etch-depth 202, whereas the input and outputs are shallow rib waveguides 108 having second etch-depths 204. Note that deep rib waveguide 106 and shallow rib waveguides 108 are disposed on slab 104 (or alternatively a substrate), which is not shown merely for ease of illustration and not as a limitation.

Figure 11B:
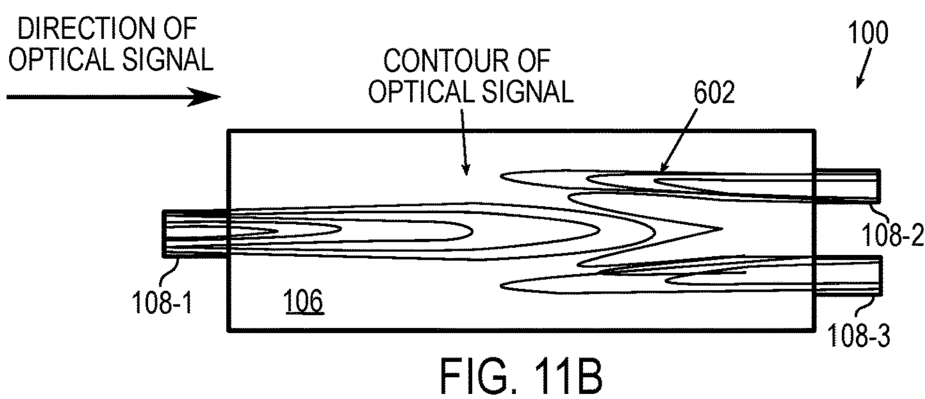
FIG. 11B is a simplified block diagram of the example multi-mode interference coupler of FIG. 11A showing optical signal contours according to some embodiments of the present disclosure.

FIG. 11B is a simplified block diagram of the example MMI coupler of FIG. 11A showing optical signal contours 602 according to some embodiments of the present disclosure. The optical signal contours represent lines of the same optical power. The contours may change depending on the wavelength of the optical signal. The MMI coupler may be used for a narrower range of wavelengths than the Y-splitter described in reference to the previous figures as the MMI coupler's overall shape may be configured suitably for the specific paths of the optical signal, which can vary significantly with the number of modes and wavelengths thereof. The use of the varied etch-depths in the direction of the optical signal provides for lower excess loss than with a single etch-depth. The transition from second etch-depth 204 to first etch-depth 202 at the input side (i.e., between shallow rib waveguide 108-1 and deep rib waveguide 106) may be implemented with structures similar to (or corresponding to) the lossless transitions as described in reference to FIG. 9. On the other hand, the transition from first etch-depth 202 to second etch-depth 204 at the output side (i.e., between deep rib waveguide 106 and shallow rib waveguides 108-2 and 108-3) may be implemented with structures similar to (or corresponding to) the Y-branch as described in reference to FIGS. 1-5.

Figure 12:
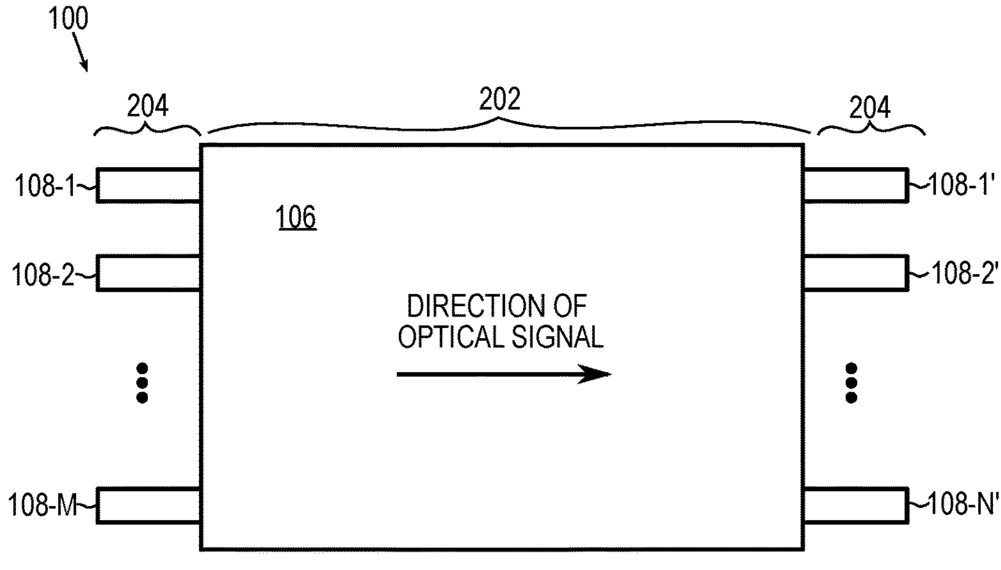
FIG. 12 is a simplified top view of another example multi-mode interference coupler according to some embodiments of the present disclosure.

FIG. 12 is a simplified top view of another example splitter-combiner 100 in an embodiment of an MMI coupler having M inputs and N outputs, where M and N are any suitable integers as desired and based on particular needs. The M inputs and the N outputs may comprise shallow rib waveguides 108. The rectangular coupler region may be of first etch-depth 202, corresponding to deep rib waveguide 106. The transition from second etch-depth 204 to first etch-depth 202 at the input side (i.e., between shallow rib waveguide 108-1 . . . 108-*m* and deep rib waveguide 106) may each comprise structures similar to (or corresponding to) the lossless transitions as described in reference to FIG. 9. The transition from first etch-depth 202 to second etch-depth 204 at the junction of deep rib waveguide 106 and shallow rib waveguides 108-1' . . . 108-*n*' may each be implemented with structures similar to (or corresponding to) the Y-branch as described in reference to FIGS. 1-5. Note that deep rib waveguide 106 and shallow rib waveguides 108 are disposed on slab 104 (or alternatively a substrate), which is not shown merely for ease of illustration and not as a limitation.

Figure 13:
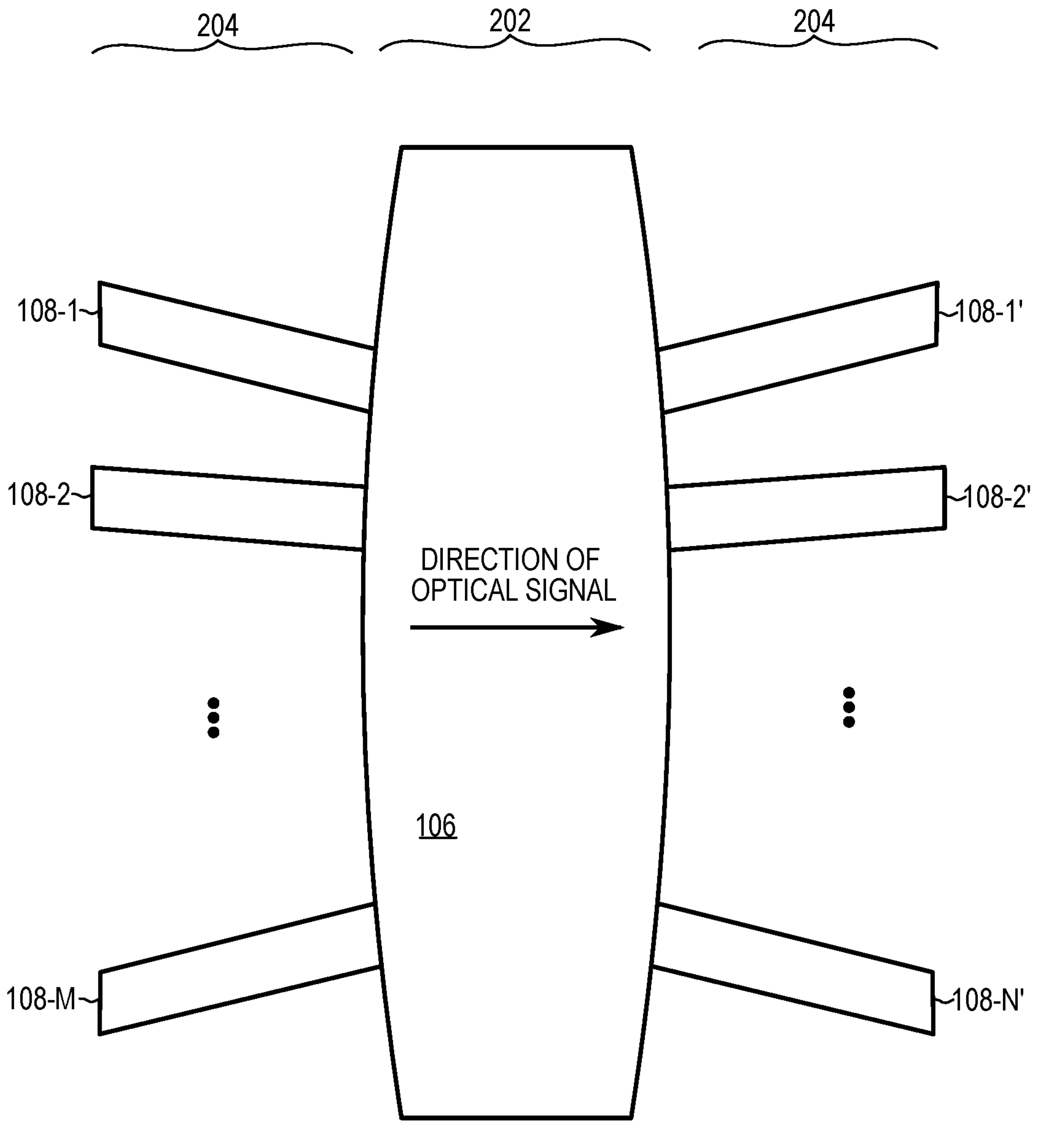
FIG. 13 is a simplified top view of an example star coupler according to some embodiments of the present disclosure.

FIG. 13 is a simplified top view of splitter-combiner 100 in an embodiment of a star coupler according to some embodiments of the present disclosure. The star coupler shown has M inputs comprising shallow rib waveguides 108-1 . . . 108-*m* and N outputs comprising shallow rib waveguides 108-1' . . . 108-*n*'. The coupler region between the inputs and the outputs may have curved edges so that the output signals may not interfere with (e.g., impinge on, touch, etc.) the boundary surfaces of the coupler region. The coupler region may correspond to deep rib waveguide 106 with first etch-depth 202. The transition from second etch-depth 204 to first etch-depth 202 at the junction of the M shallow rib waveguides 108-1 . . . 108-*m* and the coupler region comprising deep rib waveguide 106 may each comprise structures similar to (or corresponding to) the lossless transitions as described in reference to FIG. 9. The transition from first etch-depth 202 to second etch-depth 204 at the junction of the coupler region coupler region comprising deep rib waveguide 106 and N shallow rib waveguides 108-1' . . . 108-*n*' may each be implemented with structures similar to (or corresponding to) the Y-branch as described in reference to FIGS. 1-5. Note that deep rib waveguide 106 and shallow rib waveguides 108 are disposed on slab 104 (or alternatively a substrate), which is not shown merely for ease of illustration and not as a limitation.

Example Devices and Components

Figure 14:
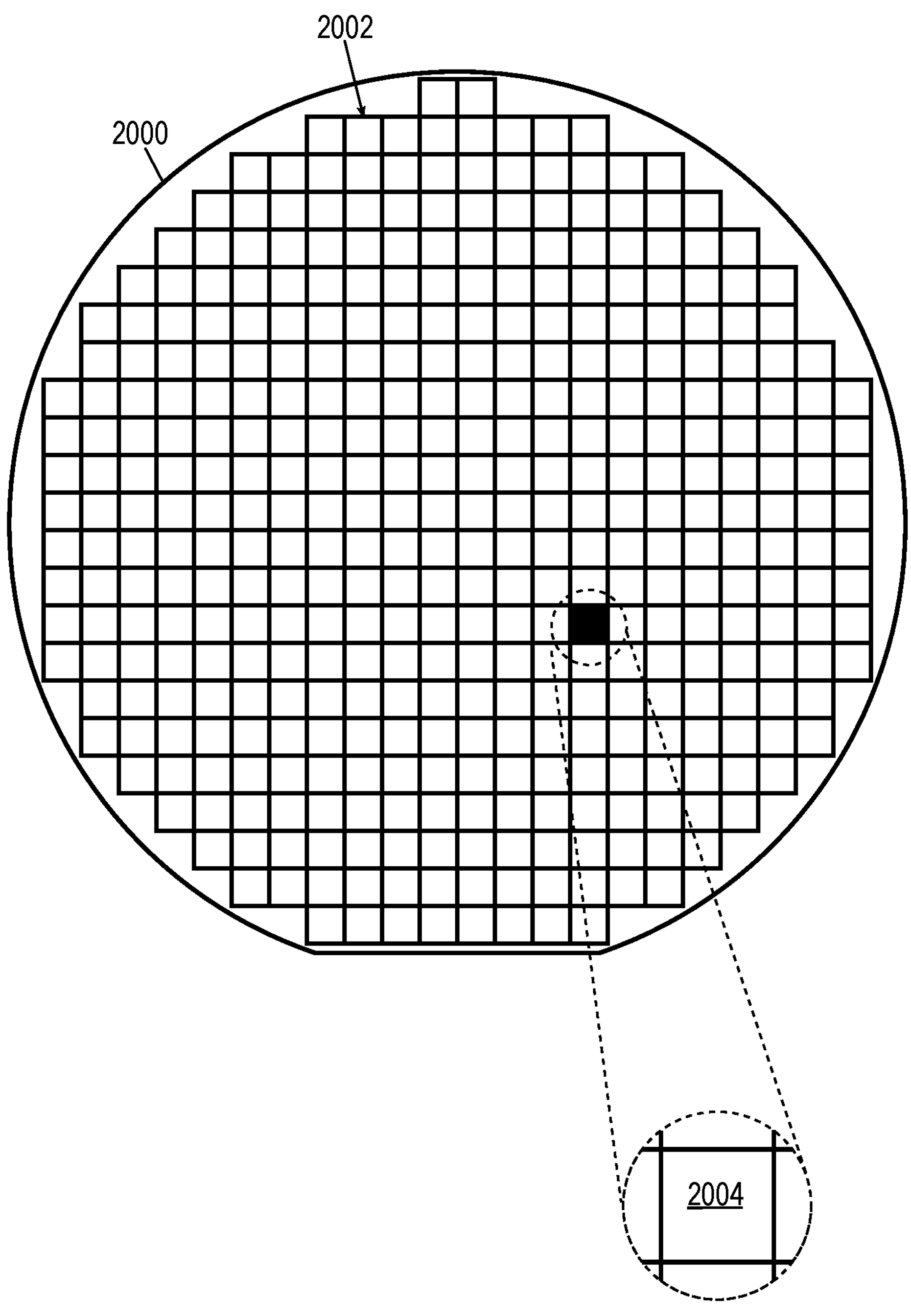
FIG. 14 shows a top view of a wafer and dies that may be included in a photonic system in accordance with at least one embodiment of this disclosure.
Figure 15:
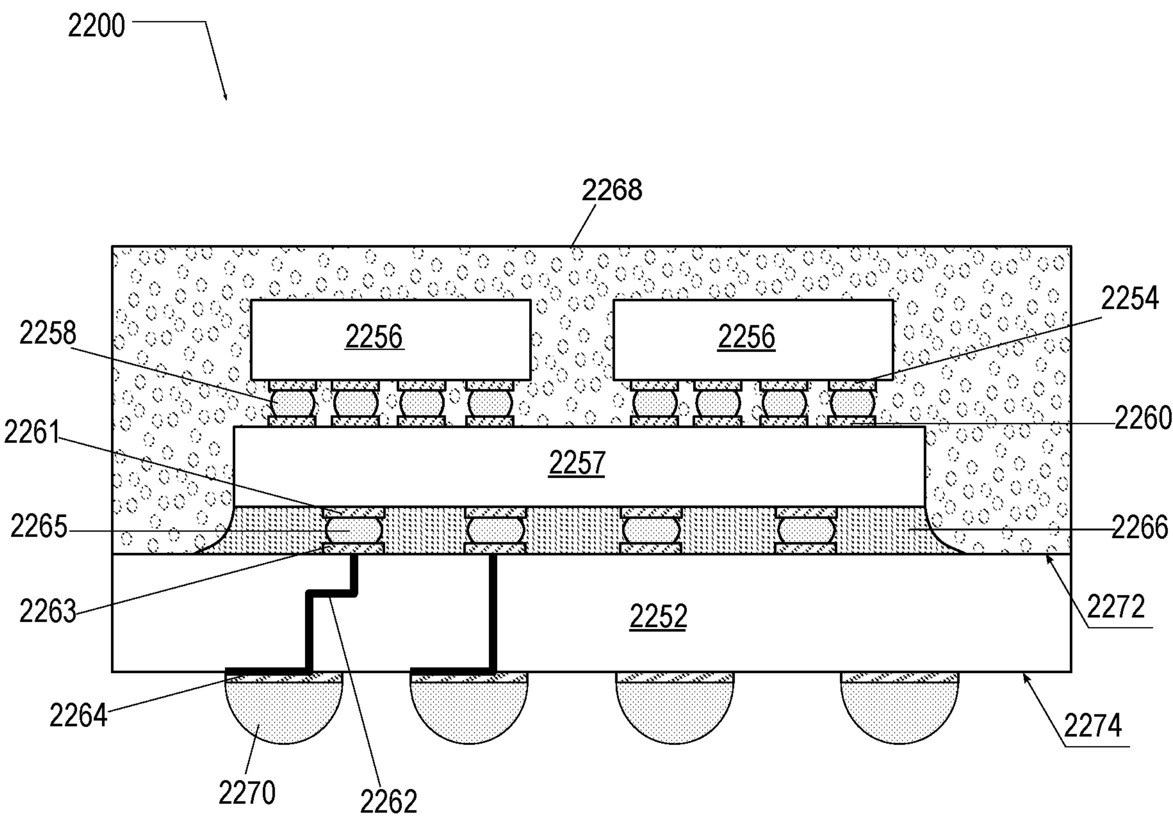
FIG. 15 is a cross-sectional side view of an integrated circuit device assembly that may include a photonic system in accordance with at least one embodiment of this disclosure.
Figure 16:
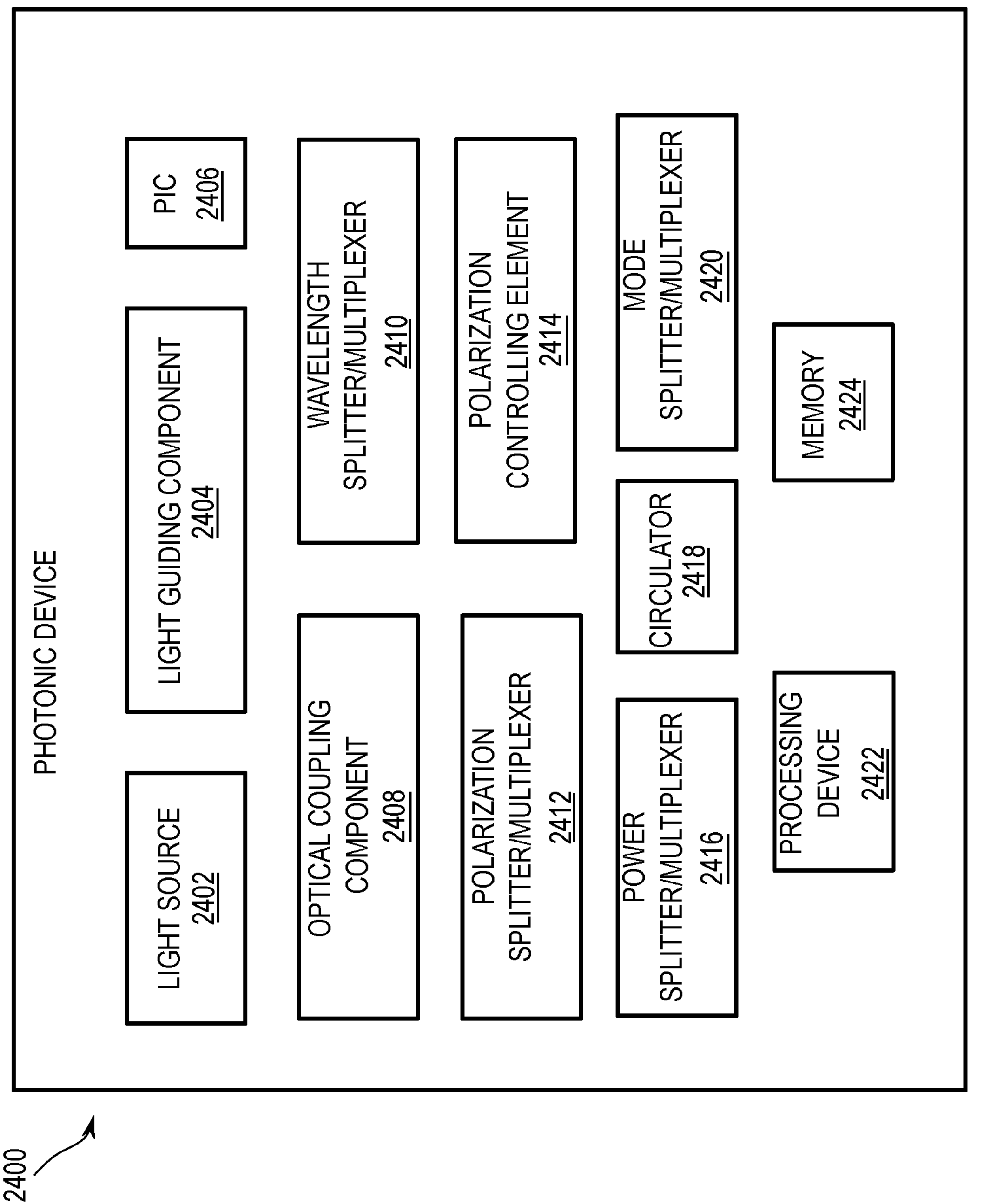
FIG. 16 is a block diagram of an example electrical device that may include a photonic system, in accordance with any of the embodiments disclosed herein.

The structures disclosed herein, e.g., any of the embodiments shown in FIG. 1-13 or any further embodiments described herein, may be included in any suitable electronic component. FIGS. 14-16 illustrate various examples of packages, assemblies, and devices that may be used with or include any of the low loss splitter-combiners as disclosed herein.

FIG. 14 is a top view of a wafer 2000 and dies 2002 that may be included in any of the photonic systems disclosed herein with the low loss splitter-combiner. Wafer 2000 may be composed of semiconductor material and may include one or more dies 2002 having IC structures formed on a surface of wafer 2000. The individual dies 2002 may be a repeating unit of an IC product that includes any suitable IC. After the fabrication of the semiconductor product is complete, wafer 2000 may undergo a singulation process in which dies 2002 are separated from one another to provide discrete "chips" (e.g., example die 2004) of the IC product. Example die 2004 may include one or more transistors, supporting circuitry to route electrical signals to the transistors, passive components (e.g., signal traces, resistors, capacitors, or inductors), and/or any other IC components. In some embodiments, wafer 2000 or die 2004 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 2004. For example, a memory array formed by multiple memory devices may be formed on a same die 2004 as a processor unit (e.g., the processing device 2420 of FIG. 16) or other logic that is configured to store information in the memory devices or execute instructions stored in the memory array. Various ones of the photonic systems disclosed herein may be manufactured using a die-to-wafer assembly technique in which some dies are attached to wafer 2000 that include others of dies and wafer 2000 is subsequently singulated.

FIG. 15 is a side, cross-sectional view of an example IC package 2200 that may be included in photonic systems as described in reference to the previous figures in accordance with any of the embodiments disclosed herein. In some embodiments, the IC package 2200 may be a system in package (SIP). As shown in the figure, package substrate 2252 may be formed of an insulator (e.g., a ceramic, a buildup film, an epoxy film having filler particles therein, etc.), and may have conductive pathways extending through the insulator between first face 2272 and second face 2274, or between different locations on first face 2272, and/or between different locations on second face 2274. These conductive pathways may take the form of any of the interconnect structures comprising lines and/or vias.

Package substrate 2252 may include conductive contacts 2263 that are coupled to conductive pathway 2262 through package substrate 2252, allowing circuitry within dies 2256 and/or interposer 2257 to electrically couple to various ones of conductive contacts 2264 (or to other devices included in package substrate 2252, not shown).

IC package 2200 may include interposer 2257 coupled to package substrate 2252 via conductive contacts 2261 of interposer 2257, first-level interconnects 2265, and conductive contacts 2263 of package substrate 2252. First-level interconnects 2265 illustrated in the figure are solder bumps, but any suitable first-level interconnects 2265 may be used, such as solder bumps, solder posts, or bond wires.

IC package 2200 may include one or more dies 2256 coupled to interposer 2257 via conductive contacts 2254 of dies 2256, first-level interconnects 2258, and conductive contacts 2260 of interposer 2257. Conductive contacts 2260 may be coupled to conductive pathways (not shown) through interposer 2257, allowing circuitry within dies 2256 to electrically couple to various ones of conductive contacts 2261 (or to other devices included in interposer 2257, not shown). First-level interconnects 2258 illustrated in the figure are solder bumps, but any suitable first-level interconnects 2258 may be used, such as solder bumps, solder posts, or bond wires. As used herein, a "conductive contact" may refer to a portion of electrically conductive material (e.g., metal) serving as an interface between different components; conductive contacts may be recessed in, flush with, or extending away from a surface of a component, and may take any suitable form (e.g., a conductive pad or socket).

In some embodiments, underfill material 2266 may be disposed between package substrate 2252 and interposer 2257 around first-level interconnects 2265, and mold 2268 may be disposed around dies 2256 and interposer 2257 and in contact with package substrate 2252. In some embodiments, underfill material 2266 may be the same as mold 2268. Example materials that may be used for underfill material 2266 and mold 2268 are epoxies as suitable. Second-level interconnects 2270 may be coupled to conductive contacts 2264. Second-level interconnects 2270 illustrated in the figure are solder balls (e.g., for a ball grid array (BGA) arrangement), but any suitable second-level interconnects 2270 may be used (e.g., pins in a pin grid array arrangement or lands in a land grid array arrangement). Second-level interconnects 2270 may be used to couple IC package 2200 to another component, such as a circuit board (e.g., a motherboard), an interposer, or another IC package, as known in the art and as discussed below with reference to FIG. 8.

In various embodiments, any of dies 2256 may be in a microelectronic assembly that includes splitter-combiner 100 as described herein. In embodiments in which IC package 2200 includes multiple dies 2256, IC package 2200 may be referred to as a multi-chip package (MCP). Dies 2256 may include circuitry to perform any desired functionality. For example, besides one or more of dies 2256 being in the microelectronic assembly, one or more of dies 2256 may be logic dies (e.g., silicon-based dies), one or more of dies 2256 may be memory dies (e.g., HBM), etc. In some embodiments, any of dies 2256 may be implemented as discussed with reference to any of the previous figures. In some embodiments, at least some of dies 2256 may not include implementations as described herein.

Although IC package 2200 illustrated in the figure is a flip-chip package, other package architectures may be used. For example, IC package 2200 may be a BGA package, such as an embedded wafer-level ball grid array (eWLB) package. In another example, IC package 2200 may be a wafer-level chip scale package (WLCSP) or a panel fan-out (FO) package. Although two dies 2256 are illustrated in IC package 2200, IC package 2200 may include any desired number of dies 2256. IC package 2200 may include additional passive components, such as surface-mount resistors, capacitors, and inductors disposed over first face 2272 or second face 2274 of package substrate 2252, or on either face of interposer 2257. More generally, IC package 2200 may include any other active or passive components known in the art.

In some embodiments, no interposer 2257 may be included in IC package 2200; instead, dies 2256 may be coupled directly to conductive contacts 2263 at first face 2272 by first-level interconnects 2265.

FIG. 16 is a block diagram of an example photonic device 2400 that may include one or more components in which splitter-combiner 100 as disclosed herein may be implemented. In addition, any suitable ones of the components of photonic device 2400 may include or be included in a die (e.g., die 2004 of FIG. 14) or one or more microelectronic packages (e.g., microelectronic packages 2200 of FIG. 15).

A number of components are shown as included in photonic device 2400, but any one or more of these components may be omitted or duplicated, as suitable for the application. In some embodiments, some or all of the components included in photonic device 2400 may be attached to one or more motherboards or any suitable support structure. In some embodiments, some or all of these components are fabricated onto a single system-on-chip (SoC) die.

In some embodiments, photonic device 2400 may include at least one light source 2402. Light source 2402 may include any suitable device for providing the necessary optical signals for various applications of photonic device 2400, ranging from communication to sensing and imaging. Light source 2402 may be designed to emit light in a controlled and efficient manner to meet the specific requirements of photonic device 2400. In some embodiment, light source 2402 may be a coherent and monochromatic light source such as a laser, to produce light of a well-defined wavelength, low divergence, and high brightness. Examples of lasers that may be included in light source 2402 include semiconductor lasers, such as edge-emitting lasers and vertical-cavity surface-emitting lasers (VCSELs). Such lasers may be used in applications such as optical communication, sensing, and laser-based treatments in medical devices. In some embodiment, light source 2402 may be a non-coherent light source such as a LED that emits light when an electric current is applied. LEDs may be simpler and more cost-effective than lasers, making them suitable for applications where high coherence is not required. Such LEDs may be used in applications such as displays, optical sensors, and short-distance communication systems. In further embodiments, light source 2402 may include one or more of a superluminescent diode (SLD), a quantum dot, a rare-earth-doped fiber/waveguide, a plasma source (e.g., plasmonics and microplasma devices), a microcavity resonators, or a nonlinear optical device (e.g., a photonic device that uses nonlinear optical processes, such as frequency doubling or parametric amplification, to generate new wavelengths).

In some embodiments, photonic device 2400 may include at least one light guiding component 2404, such as a waveguide (e.g., slab 104, rib waveguides 102), to manipulate and control the propagation of light. Light guiding component 2404 may include any suitable waveguide structures designed to confine and guide light along a specified path, allowing it to travel from one point to another with minimal loss and dispersion. Examples of waveguides that may be used as light guiding component 2404 include planar waveguides, optical fibers, photonic crystal waveguides, and rib waveguides. In some embodiments, light guiding component 2404 may include a material with a higher refractive index, known as the "core," surrounded by a material with a lower refractive index, known as the "cladding." The refractive index contrast between the core and cladding helps guide light within the core by using total internal reflection. Light is trapped within the core due to its reflection at the core-cladding interface. Light guiding component 2404 may support various modes of light propagation, such as single-mode or multi-mode.

In some embodiments, photonic device 2400 may include at least one PIC 2406. PIC 2406 may be a miniaturized and integrated optical device that incorporates photonic components, such as optical modulators, photodetectors, and waveguides, onto a single substrate. In some embodiments, PIC 2406 may include one or more optical modulators for encoding data onto an optical signal, e.g., onto light generated by light source 2402. Optical modulator of PIC 2406 may change certain properties of an optical signal, such as its amplitude, frequency, or phase, to encode information onto the signal or to perform various signal processing functions. Examples of optical modulators that may be implemented in PIC 2406 include electro-optic modulators, MZI modulators (e.g., such as MZI 112 in the described embodiments), or micro-ring modulators. In some embodiments, PIC 2406 may include one or more photodetectors (e.g., 120) for detecting and measuring the intensity of light or optical radiation across various wavelengths by converting incident light/photons into an electrical signal. Examples of photodetectors 120 that may be implemented in PIC 2406 include photodiodes, avalanche photodiodes, phototransistors, PIN diodes, CMOS image sensors, photomultiplier tubes, or quantum photodetectors. In some embodiments, PIC 2406 may include one or more waveguides, e.g., any of the waveguides described with reference to light guiding component 2404.

In some embodiments, photonic device 2400 may include at least one optical coupling component 2408. Optical coupling component 2408 may include any suitable structures designed to facilitate efficient transfer of light between different optical devices, e.g., between light source 2402 and light guiding component 2404, between light source 2402 and PIC 2406, between light guiding component 2404 and PIC 2406, or between light guiding component 2404 or PIC 2406 and a further transmission line such as a fiber (not shown in FIG. 16) that may be coupled to photonic device 2400. Examples of optical coupling elements that may be used to implement the optical coupling component 2408 include fiber couplers (e.g., fused fiber couplers or tapered fiber couplers), waveguide couplers, grating couplers, lens couplers, microlens couplers, prism couplers, fiber array couplers, or ball lens couplers. In various embodiments, splitter-combiner 100 as described herein and at least some of the various components associated therewith may be implemented in PIC 2406.

In some embodiments, photonic device 2400 may include at least one wavelength splitter/multiplexer 2410, to combine or split multiple optical signals that are carried at different wavelengths. An example is where photonic device 2400 is used in an optical communication system such as a wavelength division multiplexing (WDM) system or a dense wavelength division multiplexing (DWDM) system, where multiple data channels are transmitted simultaneously over a single optical fiber using different wavelengths of light. In various embodiments, wavelength splitter/multiplexer 2410 may include a wavelength division multiplexer, a wavelength division demultiplexer, a passive optical add/drop multiplexer, an arrayed waveguide grating, a fused fiber couplers, and interleavers, or an optical filter based device.

In some embodiments, photonic device 2400 may include at least one polarization splitter/multiplexer 2412, to combine or split multiple optical signals depending on their polarization. Similarly, in some embodiments, photonic device 2400 may include at least one polarization controlling component 2414, to control polarization of light generated and manipulated in photonic device 2400. In various embodiments, polarization splitter/multiplexer 2412 and polarization controlling component 2414 may include any suitable structure to enable the manipulation and management of polarized light signals, such as birefringent materials, waveguide structures, or specialized coatings that interact differently with different polarization states.

In some embodiments, photonic device 2400 may include at least one general power splitter/multiplexer 2416, to combine or split multiple optical signals that in a manner that is not dependent on wavelength or polarization. For example, in some embodiments, power splitter/multiplexer 2416 may be used to tap off a portion of optical power for purposes or power monitoring in photonic device 2400 in the described embodiments. Examples of devices that may be used as power splitter/multiplexer 2416 include directional couplers and MMI couplers.

In some embodiments, photonic device 2400 may include at least one circulator 2418, also referred to as a "directional splitter." Circulator 2418 may include any suitable device configured to direct light signals to travel in a specific, one-way circular path through its ports. In some embodiments, circulator 2418 may include magneto-optic materials or other techniques that create a Faraday rotation effect, where the polarization of light is rotated as it passes through circulator 2418.

In some embodiments, photonic device 2400 may include at least one mode splitter/multiplexer 2420, to combine or split multiple optical signals based on their guided modes. Examples of devices that may be used as a mode splitter/multiplexer 2420 include directional couplers, MMI couplers, tapered waveguide couplers, photonic lanterns, or photonic crystal splitters.

In some embodiments, photonic device 2400 may include a processing device 2422 (e.g., one or more processing devices). As used herein, the term "processing device" or "processor" may refer to any device or portion of a device that processes electronic data from registers and/or memory to transform that electronic data into other electronic data that may be stored in registers and/or memory. Processing device 2422 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. In some embodiments, processing device 2422 may include circuitry to control operation of other components of photonic device 2400, e.g., to control operation of PIC 2406.

In some embodiments, photonic device 2400 may include a memory 2424, which may itself include one or more memory devices such as volatile memory (e.g., DRAM), nonvolatile memory (e.g., read-only memory (ROM)), flash memory, solid state memory, and/or a hard drive. In some embodiments, memory 2424 may include memory that shares a die with processing device 2422. This memory may be used as cache memory and may include embedded DRAM (eDRAM) or spin transfer torque magnetic random access memory (MRAM). In some embodiments, memory 2424 may store instructions or data for processing device 2422 to control operation of other components of photonic device 2400, e.g., to control operation of PIC 2406.

In various embodiments, photonic device 2400 may not include one or more of the components illustrated therein, but photonic device 2400 may include interface circuitry for coupling to the one or more components. For example, photonic device 2400 may not include a processing device 2422, but may include processing device interface circuitry (e.g., a connector and driver circuitry) to which processing device 2422 may be coupled. In another example, photonic device 2400 may not include memory 2424, but may include memory interface circuitry (e.g., connectors and supporting circuitry) to which memory 2424 may be coupled. In yet another example, photonic device 2400 may not include circulator 2418, but may include circulator interface circuitry (e.g., connectors) to which a circulator 2418 may be coupled.

SELECT EXAMPLES

Example 1 provides a waveguide structure, comprising: a deep rib waveguide on a slab; and a plurality of shallow rib waveguides on the slab, in which: the deep rib waveguide has a first etch depth, the plurality of shallow rib waveguides has a second etch depth, and the first etch depth is greater than the second etch depth.

Example 2 provides the waveguide structure of example 1, in which a first sum of the first etch depth of the deep rib waveguide and a first thickness of the slab under the deep rib waveguide is same as a second sum of the second etch depth of the shallow rib waveguide and a second thickness of the slab under the shallow rib waveguide.

Example 3 provides the waveguide structure of example 2, in which: the deep rib waveguide is coupled to the plurality of shallow rib waveguides at an etch boundary, the slab has the first thickness on one side of the etch boundary, proximate to the deep rib waveguide, and the slab has the second thickness on another side of the etch boundary, proximate to the plurality of shallow rib waveguides.

Example 4 provides the waveguide structure of any one of examples 1-3, in which: each of the shallow rib waveguides has a first end coupled to the deep rib waveguide and a second end coupled to another deep rib waveguide, and the another deep rib waveguide has the first etch depth.

Example 5 provides the waveguide structure of any one of examples 1-3, in which: the deep rib waveguide comprises a coupler region of a multi-mode interference (MMI) coupler, the MMI coupler is coupled to the plurality of shallow rib waveguides on a first end of the MMI coupler, and the MMI coupler is coupled to another plurality of shallow rib waveguides on an opposite second end of the MMI coupler.

Example 6 provides the waveguide structure of example 5, in which the another plurality of shallow rib waveguides has the second etch depth.

Example 7 provides the waveguide structure of any one of examples 1-3, in which: the deep rib waveguide comprises a coupler region of a star coupler, the star coupler is coupled to the plurality of shallow rib waveguides on a first end of the star coupler, and the star coupler is coupled to another plurality of shallow rib waveguides on an opposite second end of the star coupler.

Example 8 provides the waveguide structure of example 7, in which the another plurality of shallow rib waveguides has the second etch depth.

Example 9 provides the waveguide structure of any one of examples 1-8, in which an optical signal is to travel from the deep rib waveguide to the plurality of shallow rib waveguides.

Example 10 provides the waveguide structure of example 9, in which the optical signal splits into multiple paths corresponding to the plurality of shallow rib waveguides.

Example 11 provides a photonic circuit, comprising: a plurality of waveguide structures coupled along a direction of an optical signal, in which: each waveguide structure comprises: an input end; an output end; a first waveguide having a first etch depth at the input end; and a plurality of second waveguides having a second etch depth at the output end, the second etch depth being smaller than the first etch depth, and the input ends of a subset of the plurality of waveguide structures are coupled to the output ends of other waveguide structures in the plurality of waveguide structures.

Example 12 provides the photonic circuit of example 11, in which: the plurality of waveguide structures further comprises a common slab, the slab has a first thickness under the first waveguide and a second thickness under the second waveguide of each waveguide structure, and a first sum of the first etch depth and the first thickness is approximately equal to a second sum of the second etch depth and the second thickness.

Example 13 provides the photonic circuit of example 12, in which the slab comprises a first portion having the first thickness and a second portion having the second thickness.

Example 14 provides the photonic circuit of example 13, in which a transition from the first portion of the slab to the second portion of the slab, within each waveguide structure, is perpendicular to the direction of the optical signal.

Example 15 provides the photonic circuit of any one of examples 13-14, in which a transition from the second portion of the slab in one waveguide structure, to the first portion of the slab in another waveguide structure, tapers towards the output end of the one waveguide structure.

Example 16 provides the photonic circuit of any one of examples 11-15, in which a number of the second waveguides in each plurality of second waveguides is two.

Example 17 provides a splitter-coupler in a photonic circuit, the splitter-coupler comprising: a slab; a first waveguide on the slab; a second waveguide on the slab and coupled to the first waveguide on a first end of the second waveguide; and a third waveguide on the slab and coupled to the second waveguide on a second end of the second waveguide opposite to the first end, in which: the first waveguide and the third waveguide have a first etch depth, the second waveguide has a second etch depth, and the first etch depth is smaller than the second etch depth.

Example 18 provides the splitter-coupler of example 17, in which the second waveguide is broader than the first waveguide or the third waveguide along a dimension perpendicular to a direction of an optical signal and perpendicular to the first or the second etch depth.

Example 19 provides the splitter-coupler of example 18, in which the second waveguide has linear sides.

Example 20 provides the splitter-coupler of example 18, in which the second waveguide has curved sides.

Example 21 provides the splitter-coupler of any one of examples 17-20, in which an optical signal is to enter the splitter-coupler through the first waveguide and exit the splitter-coupler through the third waveguide.

Example 22 provides the splitter-coupler of any one of examples 17-21, further comprising a plurality of third waveguides coupled to the second waveguide on the second end of the second waveguide.

Example 23 provides the splitter-coupler of example 22, in which the second waveguide is broader than the plurality of third waveguides along a dimension perpendicular to a direction of an optical signal and perpendicular to the first or the second etch depth.

Example 24 provides the splitter-coupler of any one of examples 17-23, further comprising a plurality of first waveguides coupled to the second waveguide on the first end of the second waveguide.

Example 25 provides the splitter-coupler of example 24, in which the second waveguide is broader than the plurality of first waveguides along a dimension perpendicular to a direction of an optical signal and perpendicular to the first or the second etch depth.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A waveguide structure, comprising:
- a first rib waveguide on a slab; and
- a plurality of second rib waveguides on the slab, wherein:
  - the first rib waveguide has a first height,
  - the plurality of second rib waveguides has a second height, and
  - the first height is greater than the second height,
  - the first rib waveguide is coupled to the plurality of second rib waveguides at an etch boundary,
  - the slab has a first thickness starting at one side of the etch boundary and the first rib waveguide is at the one side of the etch boundary, and
  - the slab has a second thickness starting at another side of the etch boundary and the plurality of second rib waveguides are at the another side of the etch boundary.

2. The waveguide structure of claim 1, wherein a first sum of the first height of the first rib waveguide and the first thickness of the slab under the first rib waveguide is same as a second sum of the second height of the second rib waveguide and the second thickness of the slab under the second rib waveguide.

3. The waveguide structure of claim 1, wherein:
- each of the second rib waveguides has a first end coupled to the first rib waveguide and a second end coupled to another first rib waveguide, and
- the another first rib waveguide has the first height.

4. The waveguide structure of claim 1, wherein:
- the first rib waveguide comprises a coupler region of a multi-mode interference (MMI) coupler,
- the MMI coupler is coupled to the plurality of second rib waveguides on a first end of the MMI coupler, and
- the MMI coupler is coupled to another plurality of second rib waveguides on an opposite second end of the MMI coupler.

5. The waveguide structure of claim 1, wherein:
- the first rib waveguide comprises a coupler region of a star coupler,
- the star coupler is coupled to the plurality of second rib waveguides on a first end of the star coupler, and
- the star coupler is coupled to another plurality of second rib waveguides on an opposite second end of the star coupler.

6. The waveguide structure of claim 1, wherein an optical signal is to travel from the first rib waveguide to the plurality of second rib waveguides.

7. A photonic device, comprising:

a photonic integrated circuit (PIC); and an optical coupling component coupled with the PIC, wherein the PIC includes a waveguide structure comprising a first rib waveguide on a slab and a plurality of second rib waveguides on the slab, and wherein:

the first rib waveguide has a first height, the plurality of second rib waveguides has a second height, the first height is greater than the second height, the first rib waveguide is coupled to the plurality of second rib waveguides at an etch boundary, the slab has a first thickness starting at one side of the etch boundary and the first rib waveguide is at the one side of the etch boundary, and the slab has a second thickness starting at another side of the etch boundary and the plurality of second rib waveguides are at the another side of the etch boundary.

8. The photonic device of claim 7, wherein a first sum of the first height of the first rib waveguide and the first thickness of the slab under the first rib waveguide is same as a second sum of the second height of the second rib waveguide and the second thickness of the slab under the second rib waveguide.

9. The photonic device of claim 7, wherein:

each of the second rib waveguides has a first end coupled to the first rib waveguide and a second end coupled to another first rib waveguide, and the another first rib waveguide has the first height.

10. The photonic device of claim 7, wherein:

the first rib waveguide comprises a coupler region of a multi-mode interference (MMI) coupler, the MMI coupler is coupled to the plurality of second rib waveguides on a first end of the MMI coupler, and the MMI coupler is coupled to another plurality of second rib waveguides on an opposite second end of the MMI coupler.

11. The photonic device of claim 7, wherein:

the first rib waveguide comprises a coupler region of a star coupler, the star coupler is coupled to the plurality of second rib waveguides on a first end of the star coupler, and the star coupler is coupled to another plurality of second rib waveguides on an opposite second end of the star coupler.

12. The photonic device of claim 7, wherein an optical signal is to travel from the first rib waveguide to the plurality of second rib waveguides.

13. The photonic device of claim 7, further comprising:

a light source, wherein the optical coupling component is coupled between the PIC and the light source.

14. The photonic device of claim 7, further comprising:

a light guiding component, wherein the optical coupling component is coupled between the PIC and the light guiding component.

15. The photonic device of claim 7, further comprising:

a fiber, wherein the optical coupling component is coupled between the PIC and the fiber.

16. An integrated circuit (IC) package, comprising:

a die; and an IC component coupled with the die, wherein the die includes a waveguide structure comprising a first rib waveguide on a slab and a plurality of second rib waveguides on the slab, and wherein:

the first rib waveguide has a first height, the plurality of second rib waveguides has a second height, the first height is greater than the second height, the first rib waveguide is coupled to the plurality of second rib waveguides at an etch boundary, the slab has a first thickness starting at one side of the etch boundary and the first rib waveguide is at the one side of the etch boundary, and the slab has a second thickness starting at another side of the etch boundary and the plurality of second rib waveguides are at the another side of the etch boundary.

17. The IC package of claim 16, wherein the IC component is a package substrate.

18. The IC package of claim 16, wherein the IC component is an interposer.

19. The IC package of claim 16, wherein the IC component is another die.

20. The IC package of claim 16, wherein:

the first rib waveguide comprises a coupler region of a multi-mode interference (MMI) coupler, the MMI coupler is coupled to the plurality of second rib waveguides on a first end of the MMI coupler, and the MMI coupler is coupled to another plurality of second rib waveguides on an opposite second end of the MMI coupler.

* * * * *